UNITED STATES PATENT OFFICE.

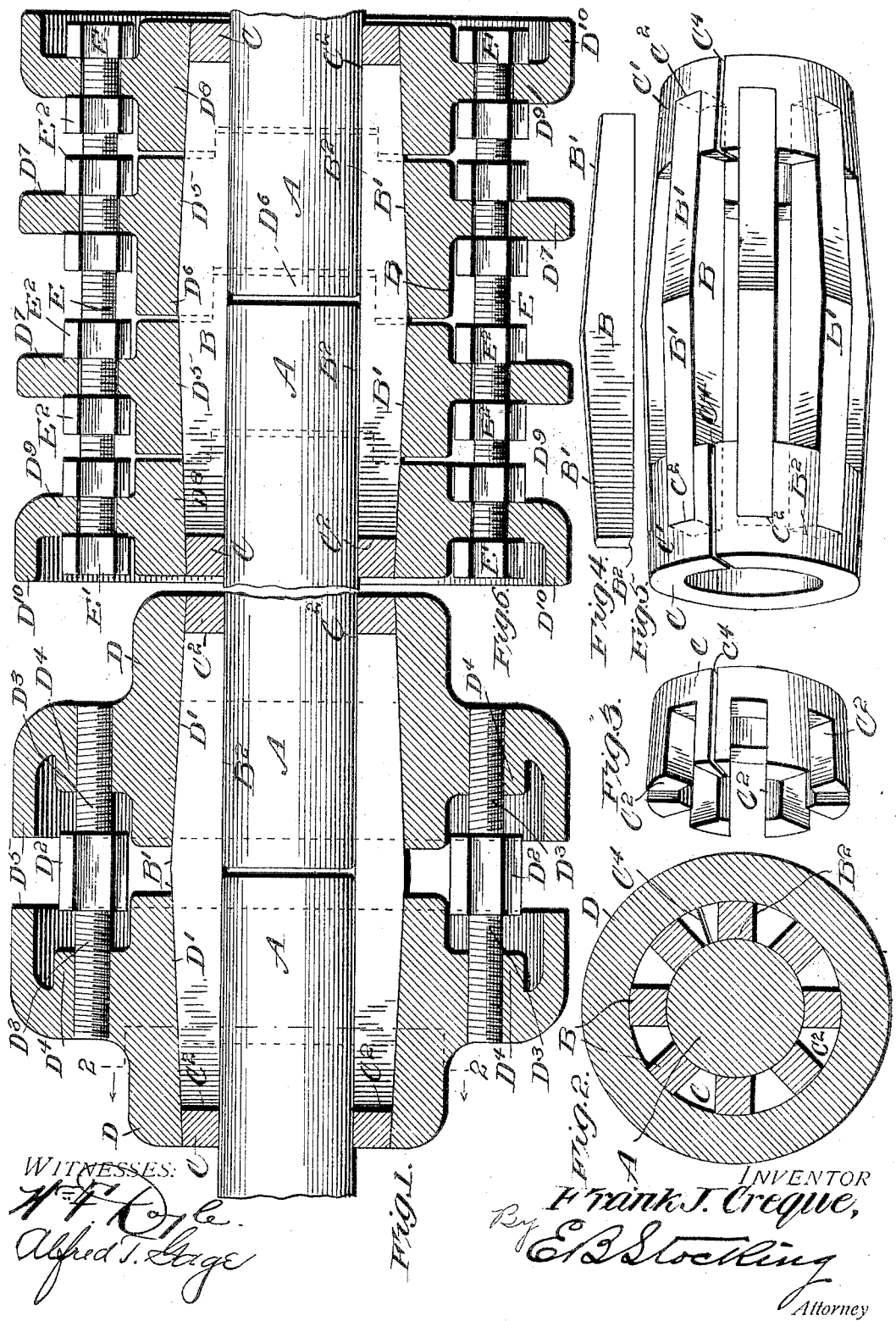

FRANK J. CREQUE, OF CUYAHOGA FALLS, OHIO.

SHAFT-COUPLING.

No. 802,269.  Specification of Letters Patent.  Patented Oct. 17, 1905.

Application filed February 23, 1905. Serial No. 246,951.

*To all whom it may concern:*

Be it known that I, FRANK J. CREQUE, a citizen of the United States, residing at Cuyahoga Falls, in the county of Summit, State of Ohio, have invented certain new and useful Improvements in Shaft-Couplings, of which the following is a specification, reference being had therein to the accompanying drawings.

This invention relates to a shaft-coupling, and particularly to a structure of that character embodying keys and compression-disks therefor.

The invention has for an object to provide an improved construction of spacing-ring adapted to receive and support the keys in connection with the compression-disks tapered to fit the inclined faces of said keys and also that of the spacing-ring.

Other and further objects and advantages of the invention will be hereinafter set forth and the novel features thereof defined by the appended claims.

In the drawings, Figure 1 is a central longitudinal section showing the invention applied to adjacent shafts; Fig. 2, a vertical section on the line 2 2 of Fig. 1; Fig. 3, a detail perspective view of a spacing-ring; Fig. 4, a similar view of one of the keys; Fig. 5, a perspective view of the keys and rings assembled, and Fig. 6 a vertical longitudinal section of a modified application of the invention.

Like letters of reference refer to like parts in the several figures of the drawings.

The letter A designates the shafts to be coupled together, which may be of any desired character or size. For the purpose of bridging the joint between the two shafts and coupling them together a series of keys B are provided, each being preferably inclined in opposite directions upon its upper surface, as shown at B', and suitably curved upon its under surface, as indicated at B². A series of these keys is arranged surrounding the shafts and spaced at proper distances from each other and supported in such position for application to the shafts by means of the rings C, one of which is disposed at each end of the keys, and the outer face thereof is suitably beveled or inclined, as at C', to correspond with the inclination or beveled surface B' of the key. Each of these rings is also provided with a series of sockets C², adapted to closely fit the ends of the keys and thus hold them therein by frictional contact, whereby both the keys and rings grip the shaft simultaneously when compressed, as hereinafter described. These rings are cut or split, as shown at C⁴, in order to permit the proper expansion thereof to fit shafts of different sizes and also the compression into contact with the shaft when the compression-disk D is applied. These disks may be of any desired configuration and drawn toward each other by any preferred means. For instance, in Fig. 1 the inner periphery of the disk is provided with an inclined surface D', corresponding to that of the keys and rings, so as to fit snugly thereon. The disks in this instance are drawn together by means of bolts D², having oppositely-threaded ends D³ threaded into bosses D⁴, carried by the disk. Each of the disks is also provided with an inturned flange D⁵ to permit space for the operation of a wrench while protecting the adjusting-bolts from contact or injury in the high speed of rotation of the shaft.

In Fig. 6 a modified application of the invention is illustrated, and it is particularly adapted for cases where the shafts bear heavy loads and greater compression is necessary. The keys B and rings C, hereinbefore described, are similar in construction, arrangement, and operation; but instead of two disks D a series thereof is used, as shown at D⁵, each being provided with an interlocking projection D⁶, as shown in Fig. 6, by which the compression-bolts E therein used are relieved from lateral strain. As herein shown, the disks D⁵ are provided with inclined surfaces upon their inner periphery and with an apertured flange D⁷ upon their outer periphery, through which the compression-bolts E extend. At the opposite end of each series of these disks D⁵ is a disk D⁸, also having an inclined inner periphery and apertured flange D⁹ to receive the opposite ends of the bolts E. A guard-flange D¹⁰ extends from each flange and protects the end nuts E' upon the threaded bolts. The parts may be properly adjusted under tension by means of the nuts E², disposed on the bolt, one of which is turned into contact with the flange of the disk as the other is moved away therefrom until the necessary movement of the disk is accomplished, when both nuts are brought into contact therewith to lock it in the usual manner.

In the operation of the invention the keys are assembled in series within the spacing-rings, as shown in Fig. 5, when these parts are inserted upon the adjacent ends of the shafts to be coupled and the compression-disks applied. As these disks are drawn together they travel in contact with the oppositely-inclined faces of the keys, thus forcing the same simultaneously inward toward a common center at the axis of the shaft and securing the most desirable compression and holding action. The inclined faces of the rings cause the same to be compressed into clamping contact with the shafts simultaneously with the keys, thus securing a holding action from both members, while the compression of the rings permits the proper movement of the disks thereon.

This coupling prevents the necessity of cutting the shafts or forming faces thereon, and the parts may be formed of any desired material, although it is preferable to provide the keys of steel and the spacing-rings of cast-iron. The stud-bolt construction for operating the compression-disks, as shown in Fig. 1, provides a single member for simultaneously operating the adjacent disks and for forming a rigid connection between the disks to permit the proper transmittal of motion from one to the other.

Having described my invention and set forth its merits, what I claim, and desire to secure by Letters Patent, is—

1. A shaft-coupling comprising spacer-rings having sockets in their inner ends, keys seated at their opposite ends therein, compression-disks engaging said keys, and means for moving said disks toward each other.

2. A shaft-coupling comprising compressible spacer-rings having sockets in their inner ends, keys frictionally held at their opposite ends therein, compression-disks engaging said keys, and means for moving said disks toward each other.

3. A shaft-coupling comprising spacer-rings having sockets in their inner ends, keys seated at their opposite ends therein, compression-disks engaging said keys, bolts having oppositely-threaded ends engaging said disks, there being guard-flanges upon said disks to protect said bolts.

4. In a shaft-coupling, spacer-rings provided with sockets, a series of oppositely-inclined keys disposed in said sockets, compression-disks independent of said rings and having inclined faces to engage said keys, and means for moving said disks toward each other.

5. In a shaft-coupling, spacer-rings provided with sockets, a series of oppositely-inclined keys disposed in said sockets, compression-disks having inclined faces to engage said keys, means for moving said disks toward each other, there being inclined faces upon said rings to fit the inclination of said disks.

6. In a shaft-coupling, a spacer-ring comprising an annular compressible body having in one end a series of elongated sockets, and means for compressing said ring upon a shaft.

7. In a shaft-coupling, spacer-rings having sockets in their inner ends, inclined keys seated therein at opposite ends, compression-disks movable upon said keys and provided with interlocking portions, and means for moving said disks toward each other.

8. In a shaft-coupling, compressible spacer-rings provided upon their inner faces with a series of sockets and having inclined peripheries, a series of keys having oppositely-inclined outer faces and seated at their opposite ends in said sockets, compression-disks having oppositely-inclined inner faces to engage the inclination of the rings and keys, and means for moving said disks toward each other.

9. In a shaft-coupling, a spacer-ring comprising a compressible cut ring having in one end a series of circumferentially-disposed sockets.

10. In a shaft-coupling, annular slotted spacing-rings provided with sockets upon their inner ends, a series of keys seated at their opposite ends in said sockets, and means for compressing said rings.

In testimony whereof I affix my signature in presence of two witnesses.

FRANK J. CREQUE.

Witnesses:
RALPH R. MOORE,
HAROLD T. HEATH.